United States Patent [19]
Khalid et al.

[11] Patent Number: 5,828,742
[45] Date of Patent: Oct. 27, 1998

[54] CALLER DISCRIMINATION WITHIN A TELEPHONE SYSTEM

[75] Inventors: Zafar M. Khalid, San Jose; William J. Beyda, Cupertino; Jay Thomas, Los Altos, all of Calif.

[73] Assignee: Siemens Business Communication Systems, Inc., Santa Clara, Calif.

[21] Appl. No.: 691,642

[22] Filed: Aug. 2, 1996

[51] Int. Cl.[6] .............................. H04M 3/00; H04M 3/42; H04M 1/00

[52] U.S. Cl. ..................... 379/199; 379/199; 379/188; 379/201; 379/215; 379/373; 379/374; 379/375

[58] Field of Search .............................. 379/67, 188, 196, 379/197, 198, 199, 142, 215, 201, 273, 374, 375

[56] References Cited

U.S. PATENT DOCUMENTS

| | | | |
|---|---|---|---|
| 4,661,975 | 4/1987 | Brecher | 379/215 |
| 4,922,490 | 5/1990 | Blakley | 379/88 |
| 5,329,578 | 7/1994 | Brennan et al. | 379/211 |
| 5,446,785 | 8/1995 | Hirai | 379/67 |
| 5,481,594 | 1/1996 | Shen et al. | 379/67 |
| 5,490,205 | 2/1996 | Kondo et al. | 379/67 |
| 5,581,604 | 12/1996 | Robinson et al. | 379/214 |
| 5,604,791 | 2/1997 | Lee | 379/375 |
| 5,627,875 | 5/1997 | Kapsales | 379/211 |
| 5,636,269 | 6/1997 | Eisdorfer | 379/215 |

*Primary Examiner*—Harry S. Hong
*Assistant Examiner*—Benny Q. Tieli

[57] ABSTRACT

A method is provided for a telephone subscriber to distinguish between callers. The method is accomplished by storing a pass code for a subscriber's telephone within a memory of the telephone system. Callers who have been informed of the pass code and who call the subscriber's telephone and enter the pass code receive special treatment. For example, upon the caller calling the subscriber's telephone, a normal ringing pattern is applied to the subscriber's telephone while a ring back signal is returned to the caller. Upon the caller entering the pass code, a special ringing pattern is applied to the subscriber's telephone. The special ringing pattern is different than the normal ringing pattern and thus indicates to a subscriber of the subscriber's telephone, even before the telephone is answered, that the caller is one of a select group of callers to whom the subscriber has shared the pass code.

24 Claims, 6 Drawing Sheets

CALLER DISCRIMINATION WITHIN A TELEPHONE SYSTEM

BACKGROUND

The present invention concerns telephone systems and pertains particularly to a subscriber distinguishing between a select group of callers and all other callers.

It is desirable for many telephone subscribers, before answering a telephone, to be able to identify a select group of callers to which to respond by answering the telephone. This is especially true for telephone subscribers who, for whatever reason, receive a great number of phone calls, only a few of which are desired.

In order to allow a telephone subscriber some ability to discriminate, some private branch exchange (PBX) systems provide for the display of an internal calling extension. Thus, upon forwarding an internal call within the PBX, the PBX will display the caller's internal extension on a subscriber's telephone provided the telephone is equipped with a digital telephone display. In this case the subscriber is able to review the displayed internal extension in order to determine whether to answer the call. While this does provide some ability of a telephone subscriber to distinguish between callers, such systems are currently limited to calls made within the PBX system. In addition, the system requires telephones to be equipped with a telephone display which is compatible with this feature of the PBX system.

In several areas, public telephone companies have begun to provide a caller identification (CLID) service. This allows for the identity of a calling number to be displayed on the telephone display of a called subscriber. However, CLID is not universally available. Additionally, the telephone of the subscriber needs to be equipped with a special device to display the calling telephone number. In addition, several telephone companies allow the calling party to suppress its number for all calls by making a request to the phone company, or for individual calls by dialing a special code. Also usage of CLID is restricted in some areas by the regulatory agencies. Another problem with CLID usage is that it provides calling number identification rather than calling person identification.

Some telephone companies provide a "priority ringing" service which works by applying a distinctive ringing pattern when a call is made from a specific phone number. Such a service, however, also provides for discrimination between calling numbers and not between callers.

SUMMARY OF THE INVENTION

In accordance with the preferred embodiment of the present invention, a method is provided for distinguishing between callers. The method is accomplished by storing a pass code for a first telephone within a memory of the telephone system. Upon a caller calling the first telephone and entering the pass code, a specified passing action is taken.

The present invention provides for an effective way for a subscriber within a telephone system to distinguish between callers.

DESCRIPTION OF THE PREFERRED EMBODIMENT

Figure 1:
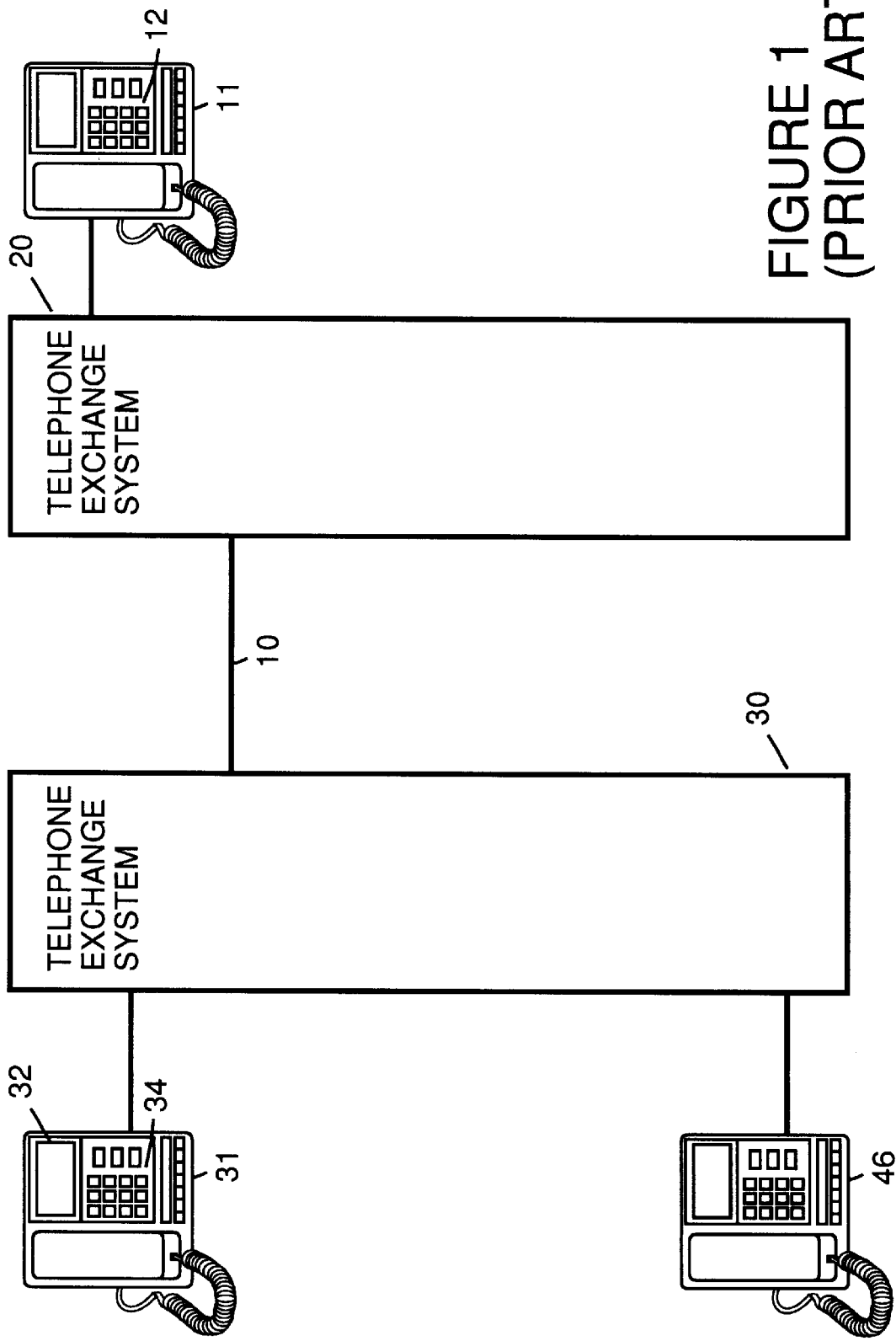
FIG. 1 is a simplified block diagram of telephone exchange systems connected by trunks in accordance with the prior art.

In accordance with the preferred embodiment of the present invention, a method allows for distinguishing between callers. A pass code for a subscriber's telephone is stored within a memory of the telephone system. Callers who have been informed of the pass code and who call the subscriber's telephone and enter the pass code receive special treatment.

For example, upon the caller calling the subscriber's telephone, a normal ringing pattern is applied to the subscriber's telephone while a ring back signal is returned to the caller. Upon the caller entering the pass code, the telephone system changes the normal ringing pattern to a distinctive ringing pattern as applied to the subscriber's telephone. The special ringing pattern is different from the normal ringing pattern and thus indicates to a subscriber of the subscriber's telephone, before the telephone is answered, that the caller is one of a select group of callers with whom the subscriber has shared the pass code.

In another preferred embodiment of the present invention, the subscriber can place the subscriber's telephone in a do not disturb mode in which a busy signal is returned to every caller. In this case, when a caller first calls the subscriber's telephone when the subscriber's telephone is in the do not disturb mode, the busy signal is returned to the caller. Upon the caller entering the pass code, a ringing pattern is applied to the subscriber's telephone and a ring back signal is returned to the caller.

In another preferred embodiment of the present invention, upon the caller calling the subscriber's telephone, and the subscriber's telephone being connected to another party, a busy signal is returned to the caller. Upon the caller entering the pass code, a special notification is forwarded to the subscriber's telephone. For example, the special notification is a simple tone such as that used for call waiting applications. Alternatively, the special notification is a priority tone such as that used for priority call waiting applications. The special notification may also be a pre-recorded identifier. The pre-recorded identifier is, for example, a pre-recorded audio message stored in the memory along with the pass code. Alternatively, the pre-recorded identifier is a pre-recorded display message stored in the memory along with the pass code.

In some situations, a call directed to the subscriber can get diverted to an adjunct processing system such as voice mail systems, auto-attendant, or an automatic call distribution (ACD) system. This happens when the subscriber fails or chooses not to answer the call personally. In these cases, in another preferred embodiment of the present invention, the caller can still enter the special pass code. The adjunct processor can recognize this pass code, and instruct the telephone system, via a command, to remove the call from the adjunct processing system and treat it as a special call. Alternatively, the telephone system can monitor the line for a special pass code and, upon detection of the special pass code, remove the call from the adjunct processing system and provide special treatment to the call. This special treatment results in, for example, applying a distinctive ringing to the subscriber telephone, and/or alerting the subscriber using an audio and/or visual indicator, as described above.

A subscriber stores the pass code through the subscriber's telephone to the telephone system. For example, the telephone system monitors keypad input from the subscriber's telephone. Upon a specific feature code being entered, the telephone system is ready to receive from a subscriber through the subscriber's telephone a new pass code. Upon determining that a format of the new pass code format is acceptable, the new pass code is stored in a memory of the telephone system. If an identifier is being stored in addition to the pass code, the telephone system also receives from the subscriber the identifier. The identifier is stored along with the new pass code in the memory.

FIG. 1 shows a telephone exchange system 30 connected to a telephone exchange system 20 via trunks 10. Telephone exchange system 30 is, for example, a private branch exchange (PBX) or a central office switch. Telephone exchange system 20 is, for example, a private branch exchange (PBX) or a public network switch. Trunks 10 connect PBX 30 and PBX 20. Trunks 10 may be, for example, direct inward dialing (DID) trunks, Tie trunks, digital T1 trunks, or some other type of prevalent trunks.

Various telephones are shown connected to telephone exchange system 30 and telephone exchange system 20. For example, a subscriber telephone 31 and a telephone 46 are shown connected to telephone exchange system 30. Subscriber telephone 31 is shown to include a display 32 and function keys and keypad 34. Telephone 46, or any other phone connected to telephone exchange system 20, telephone exchange system 30 or another telephone exchange system can be used to call subscriber telephone 31. While FIG. 1 shows only telephones 31 and 46 connected to telephone exchange system 30, these are representative of any number of telephones which may be directly or indirectly connected to telephone exchange system 30. Also, display 32 is optional and, if present is, for example, a light emitting diode (LED) display. Alternatively, display 32 may be a liquid crystal diode (LCD) display or another type of display.

A telephone 11 is shown connected to telephone exchange system 30. Telephone 11 is shown to include a keypad 12. While FIG. 1 shows only telephone 11 connected to telephone exchange system 20, it is representative of any number of telephones which may be directly or indirectly connected to telephone exchange system 20. Telephone 11 can be used to place a call to telephone 31.

Figure 2:
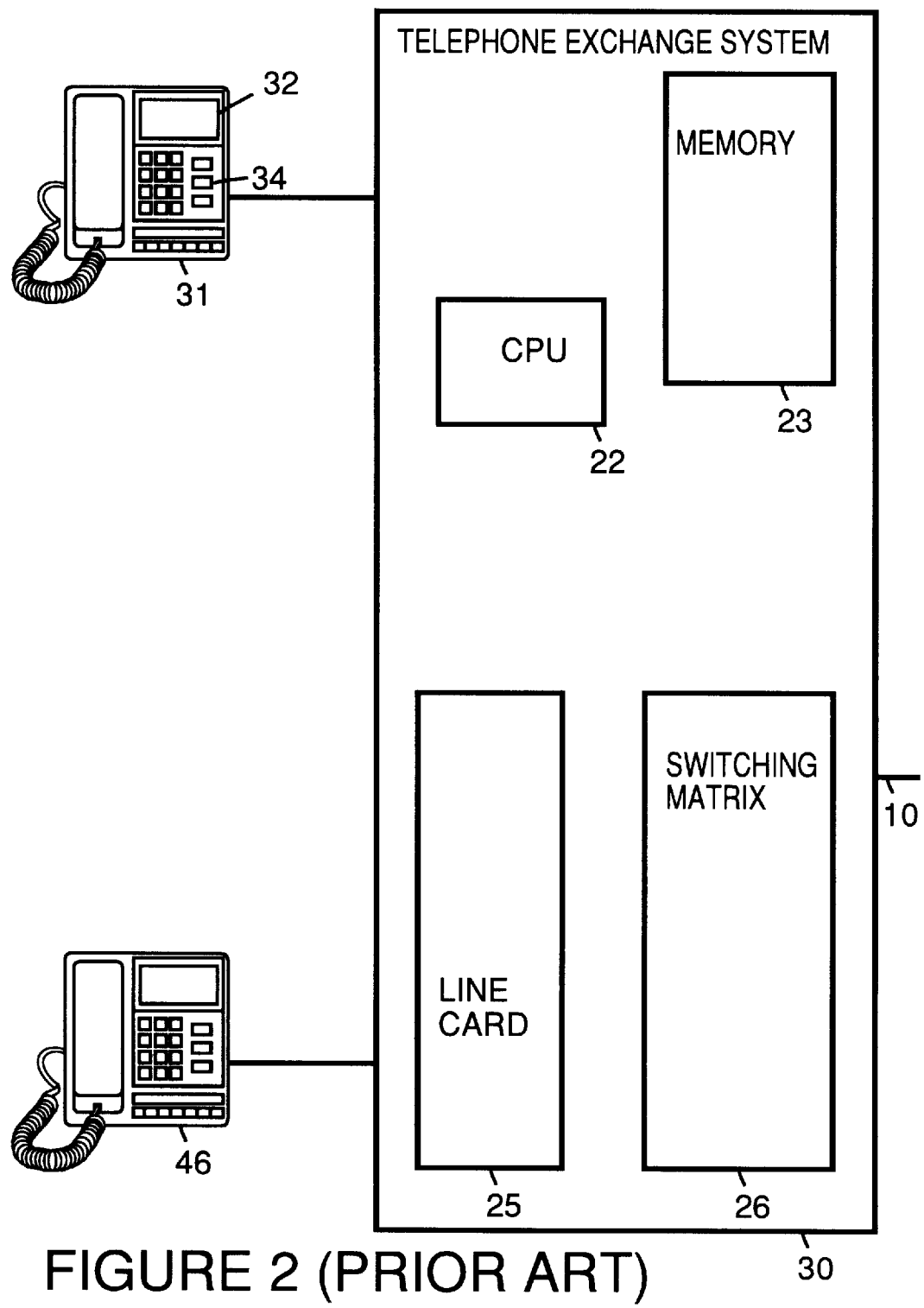
FIG. 2 is a simplified block diagram of a telephone exchange system in accordance with the prior art.

FIG. 2 shows a simplified block diagram of components within telephone system 30. Telephone system 30 includes, for example, a line card 25, a central processing unit (CPU) 22, a memory 23 and a switching matrix 26. Line card 25 serves as an interface between telephone system 30 and telephones 31 and 46. Telephone system 30 receives input from telephones 31 and 46, and trunks 10. The input, for example, is information from telephone keypad digits, feature buttons and, so on. Telephone system 30, for example under the control of CPU 22, takes specific actions on receiving inputs from telephones or trunks. These specific actions include, for example, creating connections between telephones, activating/deactivating features such as callback and message waiting, and applying signaling and ringing patterns to telephones. Switching matrix 26, responsive to CPU 22, implements voice/data connections between telephones. A memory 23 is used to store information for telephone exchange system 30.

Figure 3:
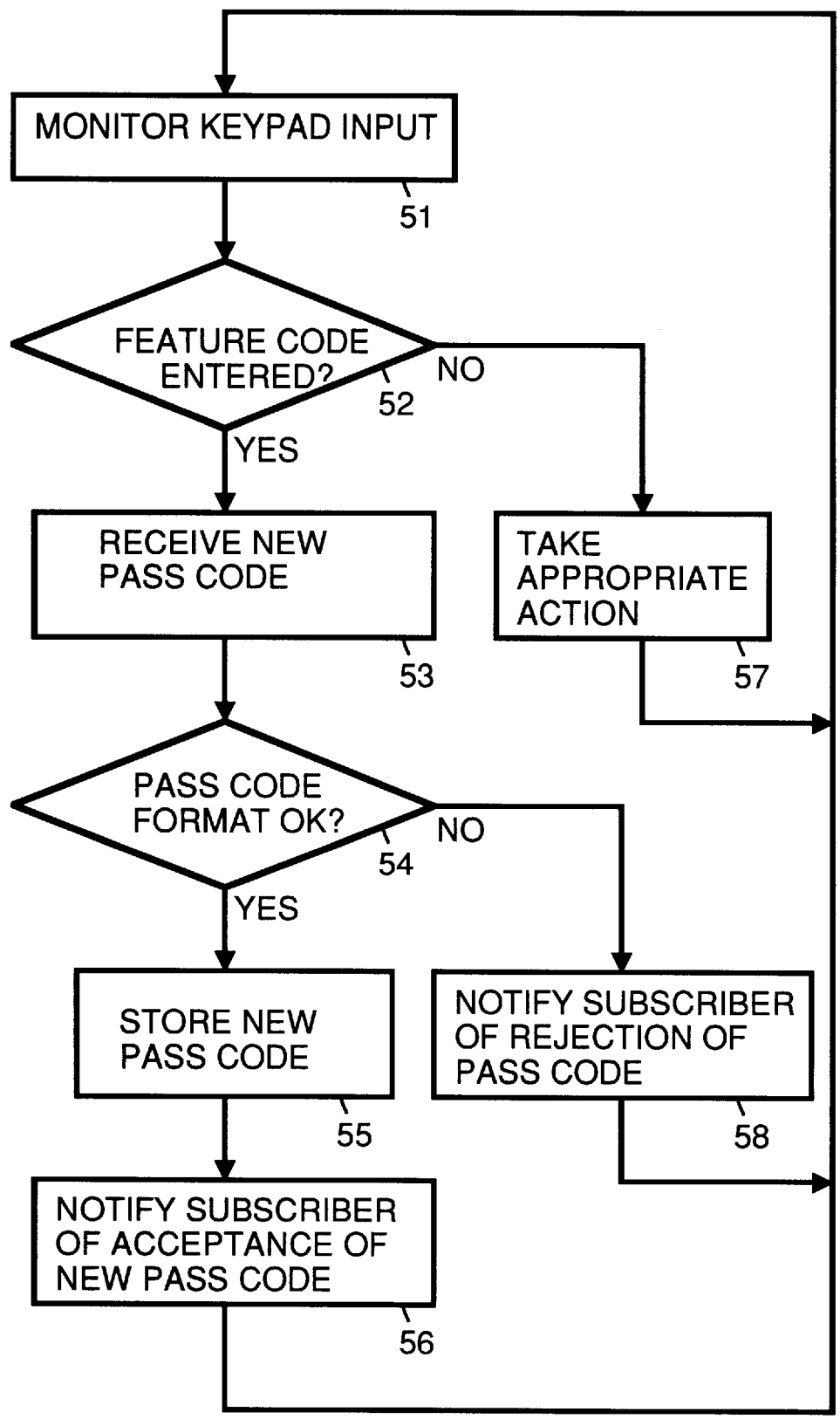
FIG. 3 is a flowchart which illustrates storage of a new pass code from a subscriber in accordance with a preferred embodiment of the present invention.

The present invention allows a subscriber of a telephone, for example telephone 31, to store a pass code into memory 23 of telephone exchange system 30. For example, FIG. 3 is a flowchart which illustrates how a pass code is entered by a subscriber telephone 31.

In a step 51, telephone exchange system 30 monitors input from function keys and keypad 34 of subscriber telephone 31. The input from function keys and keypad 34 is monitored in order to detect whether a feature code is entered. The feature code may be any combination of keys pressed from function keys and keypad 34. When, in a step 52, an entry from function keys and keypad 34 is not a feature code, some other appropriate action (or no action as appropriate) is taken, as represented by a step 57. For example, an entry from function keys and keypad 34 may be the telephone number of an outgoing call which telephone exchange system handles appropriately.

When, in step 52, an entry from function keys and keypad 34 is detected to be a feature code, in a step 53, telephone exchange system 30 receives a new pass code from the subscriber. For example, the new pass code is a series of digits which a subscriber enters using function keys and keypad 34. The series of digits is either of a fixed length, or the subscriber indicates the end of the series of digits by pressing a special function key on telephone 31.

In a step 54, telephone exchange system 30 determines whether the format of the pass code is acceptable. If not, in a step 58, telephone exchange system 30 notifies the subscriber that the new pass code has been rejected. The notification is done, for example by an audible notification sent to subscriber telephone 31. For example the audible notification may be a particular ring sequence or the audible notification may be a special tone or a message sent to a speaker or headset of subscriber telephone 31. Alternately, telephone exchange system 30 can notify the subscriber that the new pass code has been rejected by a visible response such as a message displayed on telephone display 32 which indicates that the new pass code has been rejected.

If in step 54, telephone exchange system 30 determines the format of the pass code is acceptable, in a step 55, telephone exchange system 30 stores the new pass code in memory 23. After storing the new pass code, in a step 56, telephone exchange system 30 notifies the subscriber that the new pass code has been accepted. The notification is done, for example by an audible notification sent to subscriber telephone 31. For example, the audible notification may be a particular ring sequence or the audible notification may be a special tone or a message sent to a speaker or headset of subscriber telephone 31. Alternately, telephone exchange system 30 can notify the subscriber that the new pass code has been accepted by a visible response such as a message displayed on telephone display 32 which indicates that the new pass code has been accepted.

In order to utilize the caller discrimination feature described herein, the subscriber communicates to selected potential callers the special pass code created by the subscriber. A caller in possession of the pass code can use the pass code to alert to the subscriber that a caller with the special pass code is attempting to contact the subscriber.

Figure 4:
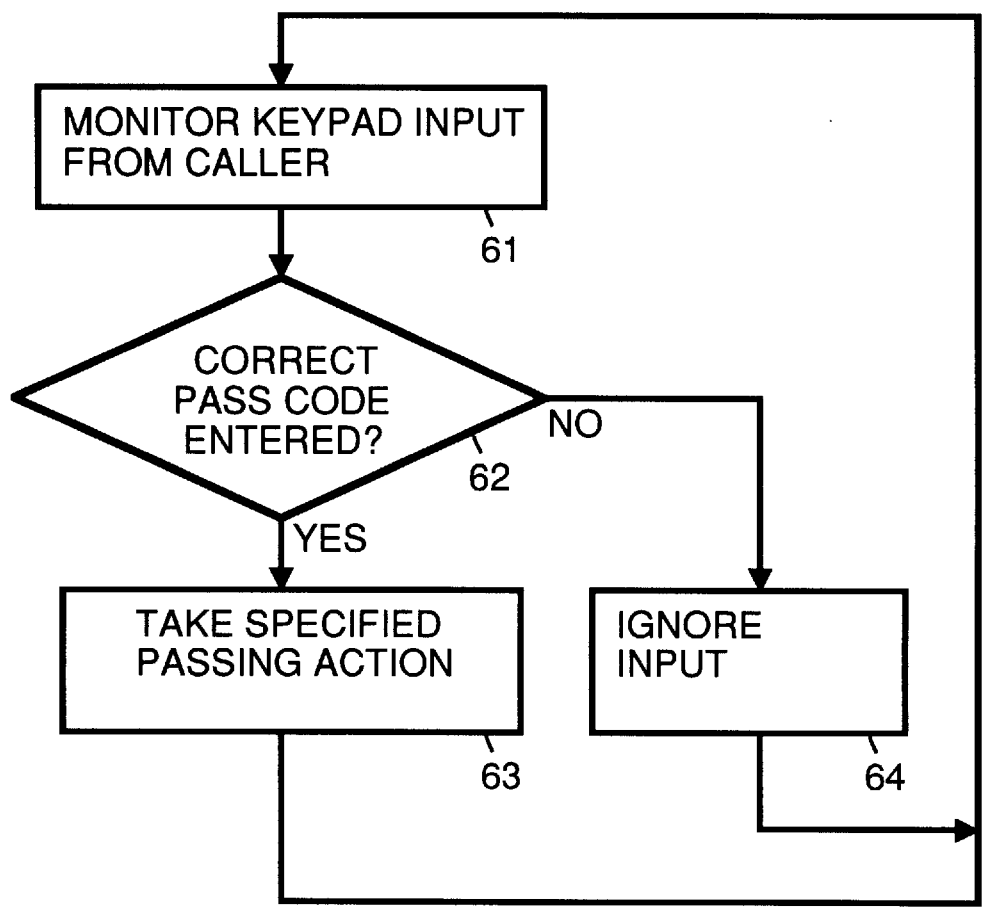
FIG. 4 is a flowchart which illustrates use of a pass code by a caller in accordance with a preferred embodiment of the present invention.

FIG. 4 is a flowchart which illustrates implementation of the caller discrimination feature as it interfaces with a caller. In a step 61, telephone exchange system monitors a connection from a caller to subscriber telephone 31. The caller may be connected to telephone system exchange 30 (e.g., the call is from telephone 46) or may be connected to a remote telephone exchange system (e.g., the call is from telephone 11). When keypad input is received from the caller, in a step 62, telephone exchange system 30 determines whether the pass code has been entered. This is done by comparing the information entered by the caller with the pass code stored in memory 23. If keypad input is received from the caller does not match the pass code stored in memory 23, in a step 64, the input is ignored.

If in step 62, telephone exchange system 30 determines the correct pass code has been entered while calling telephone 31, in a step 63 a specific pass action is taken. The passing action indicates to the subscriber that a caller in possession of the pass code is attempting to contact the subscriber.

For example, in one embodiment of the present invention, the specified passing action is a special ring pattern. In this case, when any caller calls the subscriber, telephone system exchange 30 applies a normal ringing pattern to subscriber telephone 31. If the subscriber on subscriber telephone 31 does not immediately answer the telephone, the caller will hear the ring back tone. A caller who knows the pass code for subscriber telephone 31 can enter the pass code while listening to the ring back signal. Telephone exchange system 30, upon detecting that the correct pass code has been entered will apply a special ringing pattern to subscriber telephone 31. This special ringing pattern indicates to the subscriber that a caller in possession of the pass code is making the call.

Figure 5:
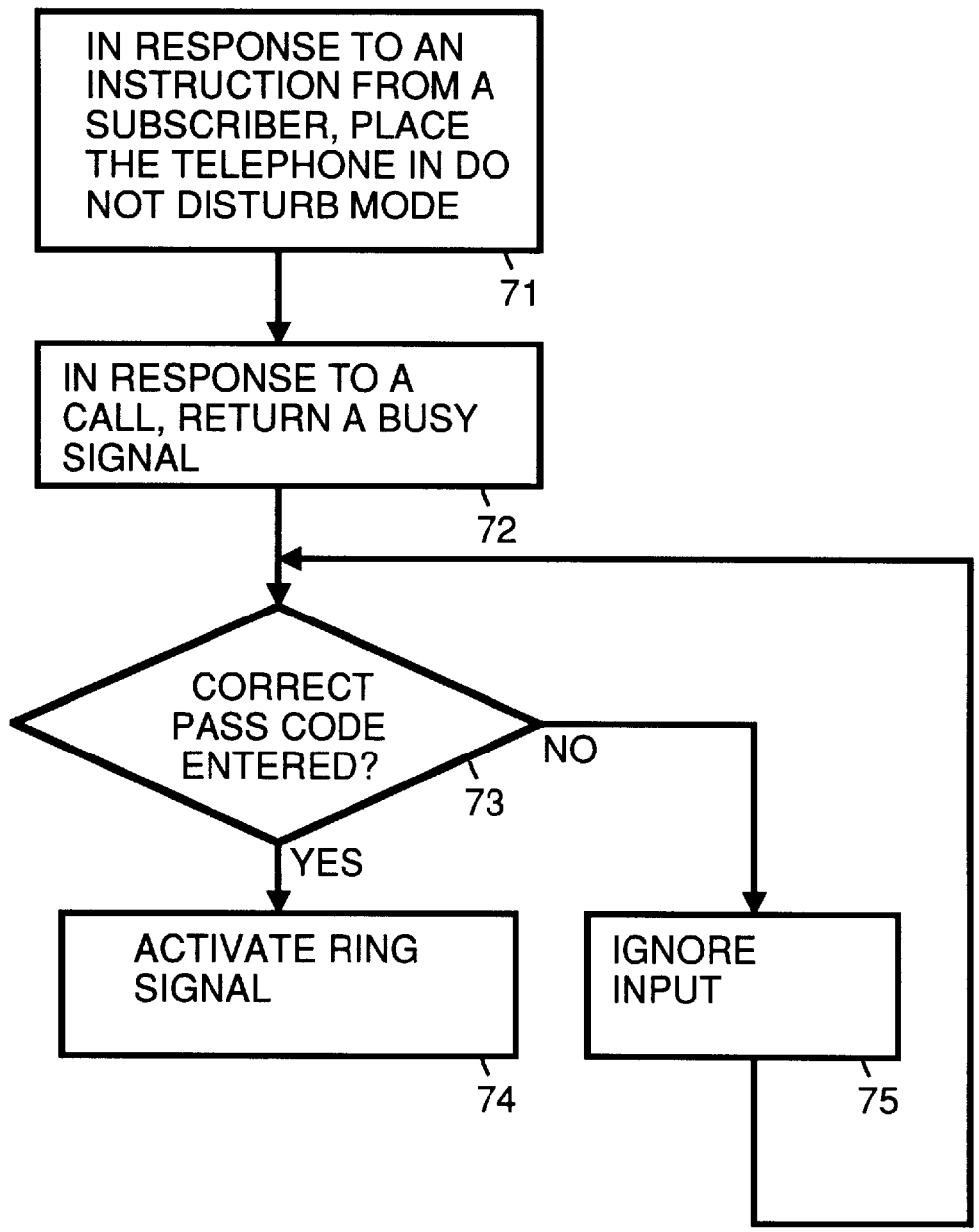
FIG. 5 is a flowchart which illustrates use of a pass code by a caller when a telephone is in a do not disturb mode in accordance with a preferred embodiment of the present invention.

An alternative specified passing action may be used for different circumstances. For example, the use of a passing action for a do not disturb mode is illustrated by FIG. 5. In a step 71, a subscriber using, for example, a special function key, instructs telephone exchange system 30 to place subscriber telephone 31 in a do not disturb (DND) mode. While in DND mode, telephone exchange system 30 returns a busy signal to all calls to subscriber telephone 31, as illustrated by a step 72.

A caller who calls subscriber telephone 31 and encounters a busy signal resulting from subscriber telephone 31 being in DND mode, can override the DND mode by entering the pass code. When keypad input is received from the caller, in a step 73, telephone exchange system 30 determines whether the pass code has been entered. This is done by comparing the information entered by the caller with the pass code stored in memory 23. If keypad input is received from the caller does not match the pass code stored in memory 23, in a step 75, the input is ignored.

If in step 73, telephone exchange system 30 determines the pass code has been entered, in a step 74, the call to subscriber telephone 31 is allowed to ring through. The passing action indicates to the subscriber that a caller in possession of the pass code is attempting to contact the subscriber and has overridden the DND mode.

In another embodiment of the present invention, an alternative specified passing action may be used when a caller with the pass code encounters a busy signal resulting from the subscriber already using subscriber telephone 31. In this case, upon the caller encountering the busy signal, if the caller knows the pass code for subscriber telephone 31, the caller can enter the pass code while listening to the busy signal. Telephone exchange system 30, upon detecting that the correct pass code has been entered will give a special notification to the subscriber. The special notification indicates to the subscriber that a caller in possession of the pass code is attempting to reach the subscriber.

The special notification is, for example, a simple tone such as that currently used for call waiting applications. Alternatively, the special notification is a priority tone such as that currently used for priority call waiting applications. In another embodiment of the present invention, the special notification is a prerecorded identifier, as further described below. For example, the pre-recorded identifier is an audio message or visual message displayed on display 32 of telephone 31. Once the subscriber receives the special notification, the subscriber can switch between calls as is typically done in call waiting.

Figure 6:
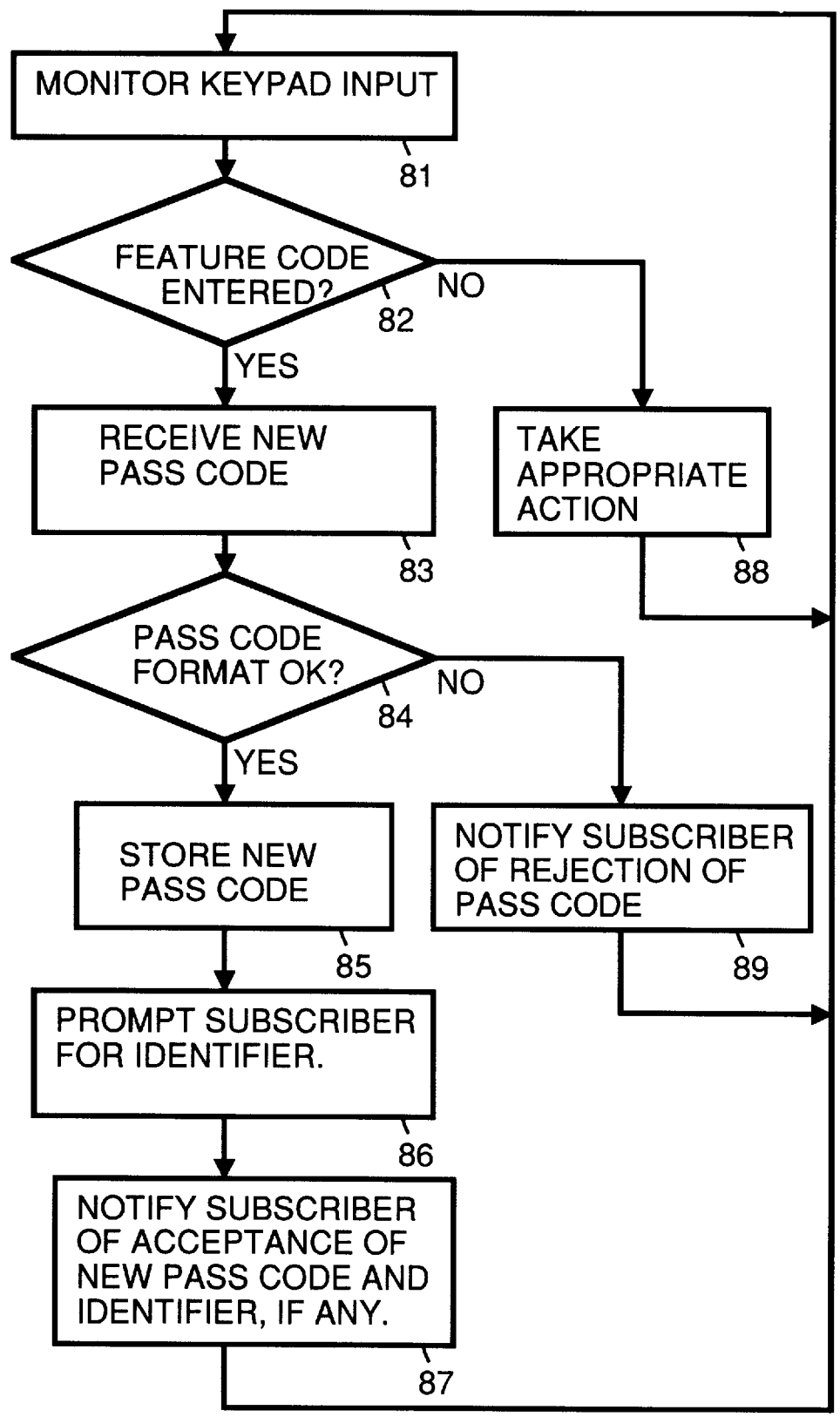
FIG. 6 is a flowchart which illustrates storage of a new pass code and identifier from a subscriber in accordance with a preferred embodiment of the present invention.

When the special notification is a prerecorded identifier, the prerecorded identifier is entered by the subscriber along with the new pass code, for example, as illustrated by FIG. 6, below.

FIG. 6 is a flowchart which illustrates how a pass code and identifier is entered by a subscriber telephone 31. In a step 81, telephone exchange system 30 monitors input from function keys and keypad 34 of subscriber telephone 31. The input from function keys and keypad 34 is monitored in order to detect whether a feature code is entered. The feature code may be any combination of keys pressed from function keys and keypad 34. When, in a step 82, an entry from function keys and keypad 34 is not a feature code, some other appropriate action (or no action as appropriate) is taken, as represented by a step 88. For example, an entry from function keys and keypad 34 may be the telephone number of an outgoing call which telephone exchange system handles appropriately.

When, in step 82, an entry from function keys and keypad 34 is detected to be a feature code, in a step 83, telephone exchange system 30 receives a new pass code from the subscriber. For example, the new pass code is a series of digits which a subscriber enters using function keys and keypad 34. The pass code sequence is either of fixed length or the subscriber indicates the end of the sequence of digits by pressing the special function key.

In a step 84, telephone exchange system 30 determines whether the format of the pass code is acceptable. If not, in a step 89, telephone exchange system 30 notifies the subscriber that the new pass code has been rejected. The notification is done, for example by an audible notification sent to subscriber telephone 31. For example, the audible notification may be a particular ring sequence or the audible notification may be a message sent to a speaker or headset of subscriber telephone 31. Alternately, telephone exchange system 30 can notify the subscriber that the new pass code has been rejected by a visible response such as a message displayed on telephone display 32 which indicates that the new pass code has been rejected.

If in step 84, telephone exchange system 30 determines the format of the pass code is acceptable, in a step 85, telephone exchange system 30 stores the new pass code in memory 23. In a step 86, telephone exchange system 30 prompts the subscriber for an optional identifier. The identifier, if given, is stored with the new pass code in memory 23. The identifier may be an audio recording by the subscriber, or it may be a message to be displayed on display 32. For example, a subscriber can record the audio statement "the boss" and then give the associated pass code to his boss in order to determine when his boss wants to contact him. In one embodiment of the present invention, multiple pass codes and associated identifiers can be stored in memory 23 for subscriber telephone 31. This allows a subscriber to separately identify a number of callers who are attempting to contact the subscriber. These callers can call from anywhere in the world and be identified as long as they use an appropriate pass code.

While in the preferred embodiment of the present invention, the predetermined identifier is used for the case where a caller breaks into a call between the subscriber and another party, in various alternative embodiments of the present invention, the identifier can be displayed (if visual) or played (if audible) on subscriber telephone 31 to identify a caller in other cases. For example, the identifier can be displayed (if visual) or played (if audible) on subscriber telephone 31 to identify a caller along with or instead of the special ring pattern for the case where the special ring pattern is used as a passing action. Likewise, the identifier can be displayed (if visual) or played (if audible) on subscriber telephone 31 to identify a caller along with or instead of the normal ring pattern or the special ring pattern for the case where the pass code is used to override the do not disturb mode.

Step 86 may be performed after step 85, as shown in FIG. 6, or before step 85, in which case the identifier is stored in memory 23 at the same time as the pass code is stored in memory 23.

After storing the new pass code and the identifier, in a step 87, telephone exchange system 30 notifies the subscriber that the new pass code (and identifier, if entered) has been accepted. The notification is done, for example by an audible notification sent to subscriber telephone 31. For example the audible notification may be a particular ring sequence or the audible notification may be a message or a confirmation tone sent to a speaker or headset of subscriber telephone 31. Alternately, telephone exchange system 30 can notify the subscriber that the new pass code has been accepted by a visible response such as a message displayed on telephone display 32 which indicates that the new pass code has been accepted.

In order to utilize the caller discrimination method described herein, the subscriber communicates to selected potential callers the pass code or pass codes created by the subscriber. A caller in possession of the pass code can use the pass code to specially indicate to the subscriber when the caller is attempting to contact the subscriber.

What is claimed is:

1. A method for distinguishing between callers within a telephone system comprising the steps of:
    (a) storing a pass code for a first telephone within a memory of the telephone system; and,
    (b) upon a caller calling the first telephone and entering the pass code, taking a specified passing action, including the following substeps:
        (b.1) upon the caller calling the first telephone immediately applying a normal ringing pattern to the first telephone and returning a ring back signal to the caller, and
        (b.2) upon the caller entering the pass code while the normal ringing pattern is being applied, performing the specified passing action.

2. A method as in claim 1 wherein in step (a) includes storing, by a subscriber, the pass code through the first telephone into the telephone system.

3. A method as in claim 1 wherein substep (b.2) includes, upon the caller entering the pass code, applying a special ringing pattern to the first telephone, the special ringing pattern being different than the normal ringing pattern.

4. A method for distinguishing between callers within a telephone system comprising the steps of:
    (a) storing a pass code for a first telephone within a memory of the telephone system; and,
    (b) upon a caller calling the first telephone and entering the pass code, taking a specified passing action, wherein step (b) includes the following substeps:
        (b.1) upon the caller calling the first telephone, and the first telephone being connected to another party, immediately returning a busy signal to the caller, and
        (b.2) upon the caller entering the pass code while the busy signal is being returned to the caller, forwarding a special notification to the first telephone.

5. A method as in claim 4 wherein in substep (b.2) the special notification is a simple tone such as that used for call waiting applications.

6. A method as in claim 4 wherein in substep (b.2) the special notification is a priority tone such as that used for priority call waiting applications.

7. A method as in claim 4 wherein in substep (b.2) the special notification is a pre-recorded identifier.

8. A method as in claim 7 wherein in substep (b.2) the pre-recorded identifier is a pre-recorded audio message stored in the memory along with the pass code.

9. A method as in claim 7 wherein in substep (b.2) the pre-recorded identifier is a pre-recorded display message stored in the memory along with the pass code.

10. A method as in claim 1 wherein in step (b) the specified passing action includes displaying a message on a display of the first telephone.

11. A method as in claim 1 wherein step (a) includes the following substeps:
    (a.1) monitoring keypad input from the first telephone;
    (a.2) upon a first feature code being entered, receiving from a subscriber a new pass code; and,
    (a.3) upon determining that a format of the new pass code format is acceptable, storing the new pass code in the memory.

12. A method as in claim 11 wherein step (a) additionally includes the following substeps:
    (a.4) receiving an identifier from the subscriber; and,
    (a.5) storing the identifier along with the new pass code in the memory.

13. A method as in claim 12 wherein the identifier is an audio message which is recorded by the telephone system in substep (a.4) and is stored by the telephone system in substep (a.5).

14. A method as in claim 12 wherein the identifier is a display message which is received by the telephone system in substep (a.4) and is stored by the telephone system in substep (a.5).

15. A method as in claim 1 wherein step (b) includes forwarding a prerecorded audio message by the telephone system to the first telephone.

16. A method for distinguishing between callers within a telephone system comprising the steps of:
    (a) storing a pass code for a first telephone within a memory of the telephone system; and,
    (b) upon a caller calling the first telephone and entering the pass code, taking a specified passing action, wherein step (b) includes the following substeps:
        (b.1) upon the caller calling the first telephone, and the first telephone being in a do not disturb mode, immediately returning a busy signal to the caller, and (b.2) upon the caller entering the pass code while the busy signal is being returned to the caller, applying a ringing pattern to the first telephone and returning a ring back signal to the caller.

17. A method for providing caller discrimination within a telephone system comprising the steps of:
   (a) upon a caller calling a first telephone, immediately applying a normal ringing pattern to the first telephone and returning a ring back signal to the caller; and,
   (b) upon the caller entering a pass code while the normal ringing pattern is being applied, applying a special ringing pattern to the first telephone, the special ringing pattern being different than the normal ringing pattern.

18. A method for providing caller discrimination within a telephone system comprising the steps of:
   (a) upon a caller calling a first telephone, and the first telephone being in a do not disturb mode, immediately returning a busy signal to the caller; and,
   (b) upon the caller entering a pass code while the busy signal is being returned to the caller, applying a ringing pattern to the first telephone and returning a ring back signal to the caller.

19. A method for providing caller discrimination within a telephone system comprising the steps of:
   (a) upon a caller calling a first telephone, and the first telephone being connected to another party, immediately returning a busy signal to the caller; and,
   (b) upon the caller entering a pass code while the busy signal is being returned to the caller, forwarding a special notification to the first telephone.

20. A method as in claim 19 wherein in substep (b) the special notification is a simple tone such as that used for call waiting applications.

21. A method as in claim 19 wherein in substep (b) the special notification is a priority tone such as that used for priority call waiting applications.

22. A method as in claim 19 wherein in substep (b) the special notification is a pre-recorded identifier.

23. A method as in claim 22 wherein in substep (b) the pre-recorded identifier is a pre-recorded audio message stored in the memory along with the pass code.

24. A method as in claim 22 wherein in substep (b) the pre-recorded identifier is a pre-recorded display message stored in the memory along with the pass code.

* * * * *